United States Patent
Moita Witka et al.

(10) Patent No.: US 11,713,664 B2
(45) Date of Patent: Aug. 1, 2023

(54) SUBSEA SEPARATOR VESSEL

(71) Applicant: FMC TECHNOLOGIES DO BRASIL LTDA, Rio de Janeiro (BR)

(72) Inventors: Anderson Moita Witka, Rio de Janeiro (BR); Hermes Machado, Rio de Janeiro (BR); Huei Sun Lai, Rio de Janeiro (BR); Alexandre Mathias Brito, Rio de Janeiro (BR); Guilherme Corrêa De Oliveira, Rio de Janeiro (BR)

(73) Assignee: FMC TECHNOLOGIES DO BRASIL LTDA, Rio de Janeiro (BR)

( * ) Notice: Subject to any disclaimer, the term of this patent is extended or adjusted under 35 U.S.C. 154(b) by 507 days.

(21) Appl. No.: 16/957,002

(22) PCT Filed: Dec. 14, 2018

(86) PCT No.: PCT/BR2018/050462
§ 371 (c)(1),
(2) Date: Jun. 22, 2020

(87) PCT Pub. No.: WO2019/119093
PCT Pub. Date: Jun. 27, 2019

(65) Prior Publication Data
US 2020/0332640 A1    Oct. 22, 2020

(30) Foreign Application Priority Data
Dec. 22, 2017    (BR) .......................... 102017027886-7

(51) Int. Cl.
*E21B 43/36*    (2006.01)
*B01D 19/00*    (2006.01)

(52) U.S. Cl.
CPC .......... *E21B 43/36* (2013.01); *B01D 19/0063* (2013.01)

(58) Field of Classification Search
CPC .......... E21B 43/36; E21B 43/01; E21B 43/34; B01D 19/00; B01D 19/0063; B01D 17/0214

See application file for complete search history.

(56) References Cited

U.S. PATENT DOCUMENTS 6,197,095 B1    3/2001    Ditria et al.
8,413,725 B2 *  4/2013    Wright ............... B01D 19/0063
                                                        166/357

(Continued)

FOREIGN PATENT DOCUMENTS

WO    2015188850 A1    12/2015
WO    WO-2015188850 A1 * 12/2015 ......... B01D 17/0211
WO    WO-2016186511 A1 * 11/2016 ............ B01D 17/02

OTHER PUBLICATIONS

International Search Report issued in International Application No. PCT/BR2018/050462, dated Mar. 27, 2019 (4 pages).

(Continued)

*Primary Examiner* — Youngsul Jeong
(74) *Attorney, Agent, or Firm* — Osha Bergman Watanabe & Burton LLP

(57) ABSTRACT

A subsea separator vessels includes single machined blocks integrated into a hull so as to combine all the valves used in the process of separating the multiphase fluid in the interior of the blocks. The separator vessels have by-pass valves in their blocks, if necessary to interrupt the separation process. The blocks function as a structure for the separating vessels, thereby replacing all of the metal structure necessary to support the tubes and valves of a conventional manifold, thus reducing the total area occupied by the separation station in the seabed.

20 Claims, 3 Drawing Sheets

(56) References Cited

U.S. PATENT DOCUMENTS

| 8,597,506 | B2* | 12/2013 | Ilstad | E21B 43/01 |
| | | | | 220/660 |
| 9,840,895 | B1 | 12/2017 | Kuhn | |
| 2010/0326922 | A1* | 12/2010 | Varanasi | B01D 17/0211 |
| | | | | 210/708 |

OTHER PUBLICATIONS

Written Opinion issued in International Application No. PCT/BR2018/050462, dated Mar. 27, 2019 (6 pages).

* cited by examiner

Figure 1 (State of the Art)
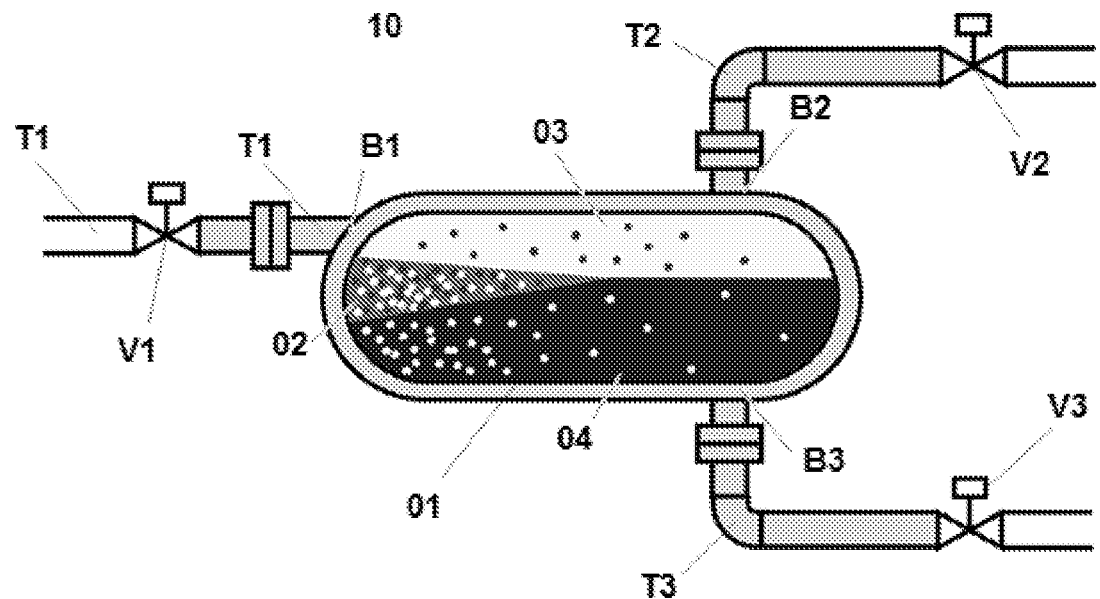
Figure 2
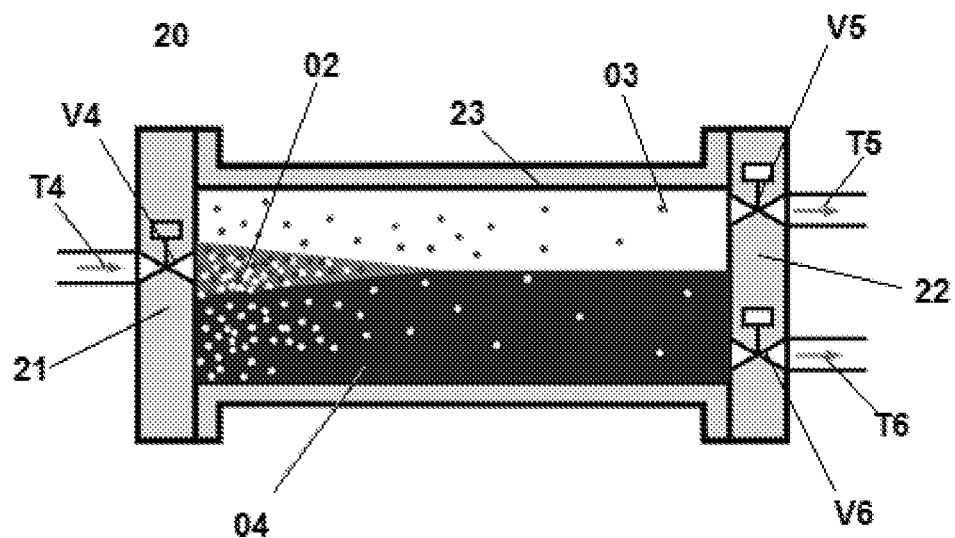

SUBSEA SEPARATOR VESSEL

FIELD OF THE INVENTION

The present invention relates to an oil separator vessel having at least one block on the top, which is advantageously used in the seabed.

History of the Invention

As is it known, in general, a subsea separation station comprises a manifold which receives fluids from the production well lines and directs them to a phase separator in order to separate the liquid/liquid phase or gas/liquid and return them separately to said manifold. Such collected fluids, after separation, can be pumped to the platform or reinjected into the wells, depending on the application.

The manifold is an equipment that provides the routing of the fluid in the subsea station, in the most diverse operational modes, being composed of a set of valves, valve actuators, tubes and a structure that accommodates all these elements, besides accommodating a separator vessel.

In general, the separation station also performs the well(s) control through valves and chokes, as well as the levels control of the separated fluids in the separator vessel through the control valves.

The fluid produced in the wells is a multi-phase fluid and comprises water, oil, gas, sand and other sediments. Thus, for phase separation the state of the art reveals that a gravitational separation system such as that shown in FIG. 1 is generally used. In this figure it is noted that said separation system (10) comprises a horizontal vessel (01), of sufficient proportions to provide residence time, so as to permit separation of the phases of gas (03) and liquid (04) of the multi-phase fluid (02) by gravity. In general, the horizontal vessel (01) has at least three nozzles (B1, B2 and B3), the inlet nozzle (B1) being located in the upper portion and being coupled to the inlet tube (T1) provided with a valve (V1); an outlet nozzle (B2) coupled to the outlet tube (T2) provided with a valve (V2); and an outlet nozzle (B3) coupled to the outlet tube (T3) provided with a valve (V3). Through the nozzle (B2), the separated gas stream (03) exits and through the nozzle (B3), the separated liquid stream (04) exits.

The separation process occurs with the entry of the multi-phase fluid (02) into the horizontal vessel (01) through the inlet tube (T1). Generally, at the entrance of the horizontal vessel (01) there is an internal element (not shown) of the kind baffle or spillway, which has the function of equalizing the flow of the multi-phase fluid (02) avoiding the turbulence of the fluid already inside the horizontal vessel (01). After entering the horizontal vessel (01), the multi-phase fluid (02) moves internally and equitably along the vessel extension. In this displacement, the different phases of gas (03) and liquid (04) are separated by the action of gravity until reaching the opposite side of the horizontal vessel (01), where each phase is withdrawn by a nozzle, in this case the gas (03) by the nozzle (B2) and liquid (04) by the nozzle (B3). In order for the separation to occur acceptably, an ideal liquid level must be maintained within the horizontal vessel (01). This can be maintained by reading and controlling the differential pressure or alternatively by a level sensor connected to a choke at the liquid (04) outlet.

A typical separation station requires a structure with many components parts, tubes, welds, valves and has high size and weight, which hinders the manufacturing, transportation and installation process. In addition, the union welds need to be qualified, and the bending tubes requires an inspection process.

The large number of tubes leads to an increase in the internal volume of liquid. These long stretches of tube can generate the so-called dead legs, which are stretches of tube without constant flow of fluid. The fluid in this section cools and can lead to the formation of hydrate, which is a serious problem to ensure adequate flow. To try to avoid this problem, thermal insulation is usually done, but the large number of tubes requires a large volume of thermal insulation to be carried out, making equipment too expensive.

All these parts must be combined in a structure strong enough to support these components in addition to the efforts coming from the lines, in a scenario of oil exploration at increasingly higher depths are becoming extremely heavy, requiring more of the equipment's.

In addition, all valves, tubes and the separator vessel itself, which in general must be large in size, require a very large foot-print, resulting in a larger foundation and consequently a final weight that makes it difficult to select installation boats, making the installation of this set of equipment on the seabed too costly.

BRIEF DESCRIPTION OF THE INVENTION

The present invention has the objective of solving the technical problems mentioned above, which leads to a drastic reduction of costs of manufacture, installation and operation of subsea separation station.

For these purposes, the subsea separator vessel according to the present invention comprises at least a single block machined on the separator vessel top, so as to integrate all of the valves used in the separation process. Said block, besides integrating the valves, acts as a support for the separator vessel, thus replacing all the metallic structure necessary to support the tubes and valves of a manifold of the state of the art, consequently reducing the total area occupied by the subsea separation station.

According to the invention there is provided a subsea separator vessel, comprising a hull element and at least one block element together forming an enclosed volume of the separator vessel. The enclosed volume is the volume wherein the separation by gravitation take place. The orientation of the main length of this enclosed volume may be horizontal or vertical. The walls of the enclosed volume are formed partly by the hull and partly by a block element. The hull is attached to the block element in a manner of sealing the connection forming the enclosed volume. There may be two block elements but preferably there is one block element forming part of the enclosed volume. There is at least one flow passage, between the outside of the separator vessel and the enclosed volume, arranged through the block element with at least one control flow valve positioned in the flow passage within the block element.

The flow passages through the block element may form an inlet flow passage and possible a multiple outlet flow passages. Preferably are all inlet and outlet passages for the enclosed volume arranged through a common block element.

Within the block element there may be arranged a connection flow passage connecting two flow passages in the block element, preferably an inlet flow passage with one of the outlet flow passages with a control valve in between the connection point to the inlet flow passage and the outlet flow passage.

The inlet flow passage in the block element may be connected to a flow tube within the enclosed volume leading to an outlet point within the enclosed volume at the opposite end of the enclose volume relative the block element.

BRIEF DESCRIPTION OF THE FIGURES

The subsea separator vessel with valve block integrated to the tops according to the present invention may be well understood from the accompanying illustrative figures, which in a schematic and non-limiting form of their scope represent:

FIG. 1—View of a schematic generic separator vessel of the prior art;

FIG. 2—Schematic view of a first embodiment of the separator vessel according to the present invention;

DETAILED DESCRIPTION OF THE INVENTION

Figure 3:
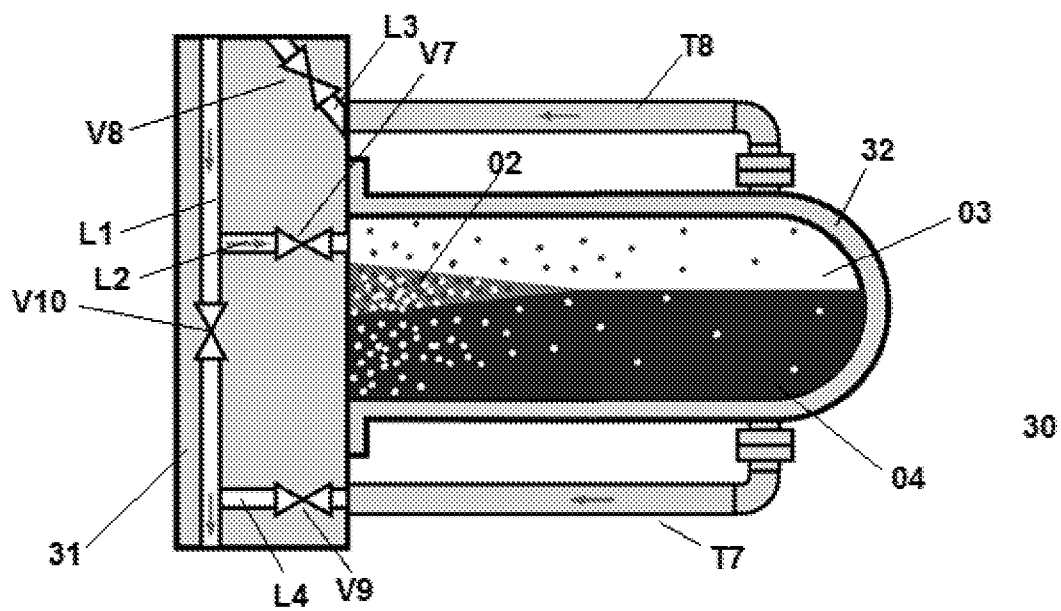
FIG. 3—Schematic view of a second embodiment of the separator vessel according to the present invention.

In a first aspect, according to FIG. 2, the present invention provides a new conception of the structure of a gravitational separator vessel (20) comprising two machined blocks (21) and (22), both embodied as separator vessel tops (20).

In this configuration, the separator vessel (20) also becomes a structural element and the lines are connected directly to the blocks (21) and (22), reducing the total area occupied of the station and reducing the amount of structures required therefor. The blocks (21, 22) have three functions which are (i) closure of the vessel; (ii) access opening for assembly of the internal elements, since when using a simple spherical top it is necessary to include a large flange in the vessel to allow the internal access of an assembler or welder for fixing the internal equipment's; and (iii) use as manifold of valves, which consequently eliminates a large number of tubes from the typical manifold arrangement of the prior art.

In this embodiment illustrated in FIG. 2, the separator vessel (20) comprises two blocks (21, 22), a hull (23), valves (V4, V5, V6) and tubes (T4, T5, T6). The block (21) is located on the inlet of the separator vessel (20) and comprises an inlet valve (V4). The block (22) is located on the outlet top of the separator vessel (20) and comprises two outlet valves (V5) for the gas flow (03) and (V6) for the liquid flow.

The separation of the multi-phase fluid (02) occurs as it enters the separation vessel (20) through the tube (T4). The multi-phase fluid (02) will reside for sufficient time inside the separator vessel (20) in order to provide that the gas (03) and liquid (04) phases separate by the action of gravity as it traverses the extension of said vessel separator (20). Each flow is withdrawn by a nozzle, the gas (03) being by the tube (T5) and the liquid (04) by the tube (T6). The valve (V6) may be a choke valve in order to maintain an optimum operational level of the liquid (04) within the separator vessel (20).

Still in FIG. 2, it is observed that the separator vessel (20) has a compaction of the valves in the blocks (21, 22), which is advantageous if a more linear configuration is desirable.

Figure 4:
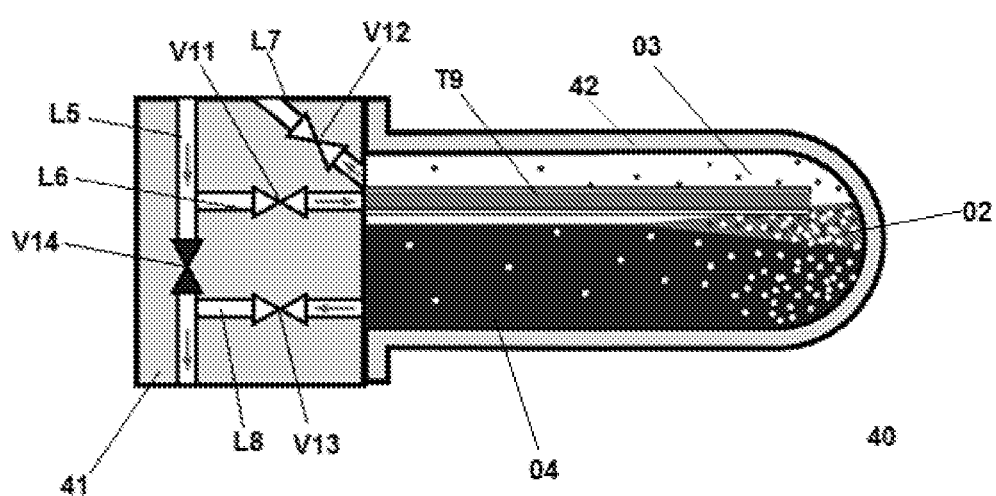
FIG. 4—Schematic view of a third embodiment of the separator vessel according to the present invention.
Figure 5:
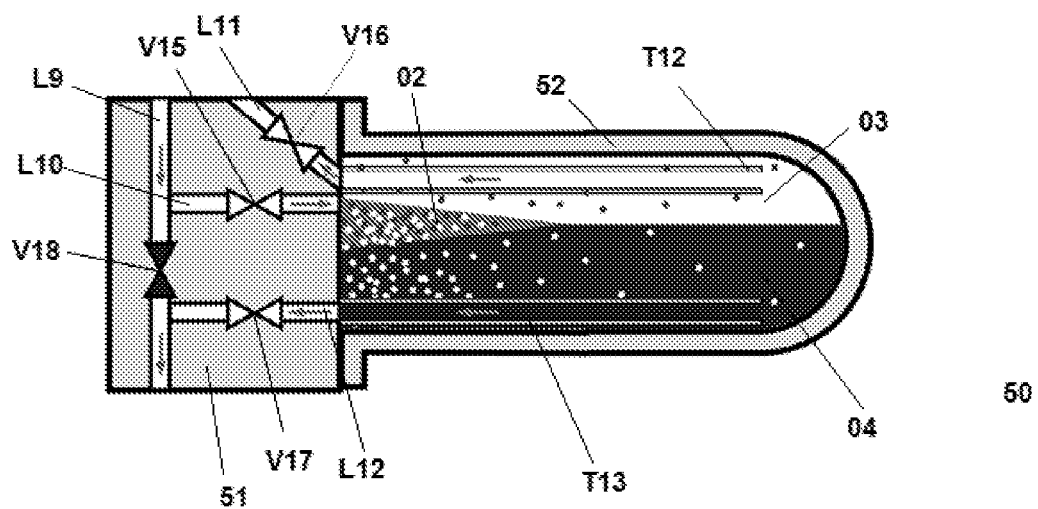
FIG. 5—Schematic view of a fourth embodiment of the separator vessel according to the present invention.

FIGS. 3, 4 and 5 illustrate other embodiments equally within the same inventive concept of the present invention, comprising separator vessels (30, 40, 50) provided with a single block functioning as the top of the separator vessel. These configurations allow the valves to be concentrated in a single block, thus providing the actuation control of these valves much more simplified, since the control will no longer be divided in two blocks. In addition, the use of only one block allows the use of a by-pass valve of the vessel inside the block, thereby discarding the need for external tubes, with its inherent problems, for the use of the by-pass valve.

Depending on the arrangement of process items, the access for operation of the valves and the necessity or otherwise of pigable by-pass lines, said embodiments of separator vessels (30, 40, 50) shown in FIGS. 3-5 can be carried out, in view of the conception provided by the present invention.

Specifically, the separator vessel (30) of a second embodiment shown in FIG. 3 comprises a block (31) with internal lines (L1, L2, L3, L4), inlet valve (V7), two outlet valves (V8, V9), a by-pass valve (V10), a hull (32) and two outlet tubes (T7) and (T8).

The multi-phase fluid (02) enters the separating vessel (30) through the inner lines (L1) and (L2) and, for this, the by-pass valve (V10) is closed. The separation process occurs by gravity, the multi-phase fluid (02) remaining within the separator vessel (30) long enough for the gas (03) and liquid (04) phases to separate. The gas (03) returns through the outer tube (T8) being withdrawn from the vessel by the inner line (L3) of the block (31). Likewise, the liquid (04) returns through the outer tube (T7) being withdrawn from the vessel by the inner line (L4). The valves (V7, V8, V9) control the flow of fluids, respectively, multi-phase fluid (02), gas (03) and liquid (04).

FIG. 4 shows a third embodiment of separator vessel (40) according to the present invention comprising a block (41) with internal lines (L5, L6, L7, L8), inlet valve (V11), two outlet valves (V12, V13), a by-pass valve (V14), a hull (42) and an inner tube (T9).

The multi-phase fluid (02) enters the separating vessel (40) through the inner lines (L5) and (L6) and, for this, the by-pass valve (V14) is closed. The multi-phase fluid (02) flows through the inner tube (T9). The separation process occurs by gravity, where the multi-phase fluid (02) will remain inside the separator vessel (30) long enough for the gas (03) and liquid (04) phases to separate. The gas (03) returns to the block through the inner line of the block (L7) and the liquid (04) returns through the inner line (L8). The valves (V11, V12, V13) control the flow of fluids, respectively, multi-phase (02), gas (03) and liquid (04) fluids.

FIG. 5 illustrates a fourth embodiment of the invention, wherein the separator vessel (50) comprises a block (51) with internal lines (L9, L10, L11, L12), inlet valve (V15), two outlet valves (V16, V17), a by-pass valve (V18), a hull (52) and two inner tubes (T12) and (T13).

The multiphase fluid (02) enters the separator vessel (50) through the inner lines (L9, L10) and, for this, the bypass valve (V15) is closed. The separation process occurs by gravity, where the multiphase fluid (02) will remain within the separator vessel (30) long enough for the gas (03) and liquid (04) phases to separate. The gas (03) is returned to the block by the inner tubing (T12) connected to the inner line (L11), while the liquid (04) returns to the block (51) by the inner tubing (T13) connected to the inner line (L12).

The advantage of the configurations shown by the separator vessels (40, 50) shown in FIGS. 4 and 5, respectively, is due to the fact that the tubes (T11, T12, T13) are installed internally in the separator vessels (40, 50) thus, the pressure in the tubes (T11, T12, T13) is equalized, so that said tubes (T11, T12, T13) can be made with very reduced wall thicknesses. Further, such configurations also prevent the inclusion of nozzles on the sides of said separator vessels (40, 50).

In addition, the valves (V6, V9, V13, V17) may advantageously be choke-type control valves, due to the fact that these valves are in the tubes where the separated liquid (04) flows.

Among the numerous advantages that the subsea separator vessel with valve block integrated to the tops, object of the present invention provides, stands out the production of the simpler and lighter valve block; elimination or simplification of the manifold; reduction of dead legs in the system, which may contribute, for example, to hydrate formation; total weight reduction of the station structure; possibility of withdrawing the access nozzle from the vessel, as the block will be screwed thereon and thus serve as the nozzle itself.

It should further be noted that, notwithstanding the fact that the subsea separator vessels described with reference to FIGS. 2 to 5 have been illustrated in a horizontal conception, those skilled in the art will appreciate that the inventive concept of the present invention also achieves subsea separator vessels with conception, without thereby changing or falling outside the scope of protection claimed below.

The invention claimed is:

1. A subsea separator vessel, comprising:
   a hull element; and
   a block element, together forming an enclosed volume of the subsea separator vessel, with an inlet flow passage and two outlet flow passages between an outside and the enclosed volume and arranged through the block element, with at least one flow control valve positioned in the at least one inlet and outlet flow passages within the block element, the block element comprising an additional flow passage connecting the inlet and outlet flow passages, connected to the enclosed volume, within the block element, the additional flow passage comprising an additional flow control valve.

2. The subsea separator vessel according to claim 1, wherein all flow passages between the outside and the enclosed volume comprises at least a part of the flow passage arranged through the block element.

3. The subsea separator vessel according to claim 1, wherein the flow control valves for the inlet and outlet flow passages connecting the enclosed volume with the outside are arranged within the block element.

4. The subsea separator vessel according to claim 1, wherein at least one flow passage runs through the block element with a flow control valve within the block element, and further through a pipe element connected to the block element and wherein an opposite end of the pipe element is connected to an opening in the hull element into the enclosed volume.

5. The subsea separator vessel, according to claim 1, wherein the block element comprises a single block integrated in the hull element, said single block being provided with external outlet tubes and internal lines equipped with respective flow control valves.

6. The subsea separator vessel, according to claim 5, where said flow control valves and said internal lines are integrated in said single block.

7. The subsea separator vessel, according to claim 5, wherein the single block is machined.

8. The subsea separator vessel, according to claim 5, wherein at least one of the flow control valves is a choke valve.

9. The subsea separator vessel, according to claim 1, wherein the block element comprises a single block integrated into the hull element, said single block being provided with flow control valves provided on respective inner lines, and an inner tube which is connected to one of the inner lines.

10. The subsea separator vessel, according to claim 9, wherein said flow control valves and said inner lines are integrated in said single block.

11. The subsea separator vessel, according to claim 9, wherein the single block is machined.

12. The subsea separator vessel, according to claim 9, wherein at least one of said flow control valves is a choke valve.

13. The subsea separator vessel, according to claim 1, wherein the block element comprises a single block integrated in the hull element, said single block being provided with flow control valves provided in respective internal lines, a first inner tube and a second inner tube, wherein the first inner tube is connected to a first internal line, and the second inner tube is connected to a second internal line.

14. The subsea separator vessel, according to claim 13, wherein said flow control valves and said internal lines are integrated in said single block.

15. The subsea separator vessel, according to claim 13, wherein the single block is machined.

16. The subsea separator vessel, according to claim 13, wherein at least one of said flow control valves is a choke valve.

17. The subsea separator vessel, according to claim 1, wherein an orientation of the subsea separator vessel is horizontal or vertical.

18. A subsea separator vessel, comprising two blocks provided at ends of a hull, flow control valves and tubes, wherein said blocks are integral with the hull to form an enclosed volume of the subsea separator vessel, wherein a first valve of the flow control valves is integrated with a first block of the two blocks and a second valve and a third valve of the flow control valves are integrated with a second block of the two blocks.

19. The subsea separator vessel, according to claim 18, wherein the two blocks are single machined blocks.

20. The subsea separator vessel, according to claim 18, wherein at least one of the flow control valves is a choke valve.

* * * * *